Patented Nov. 8, 1938

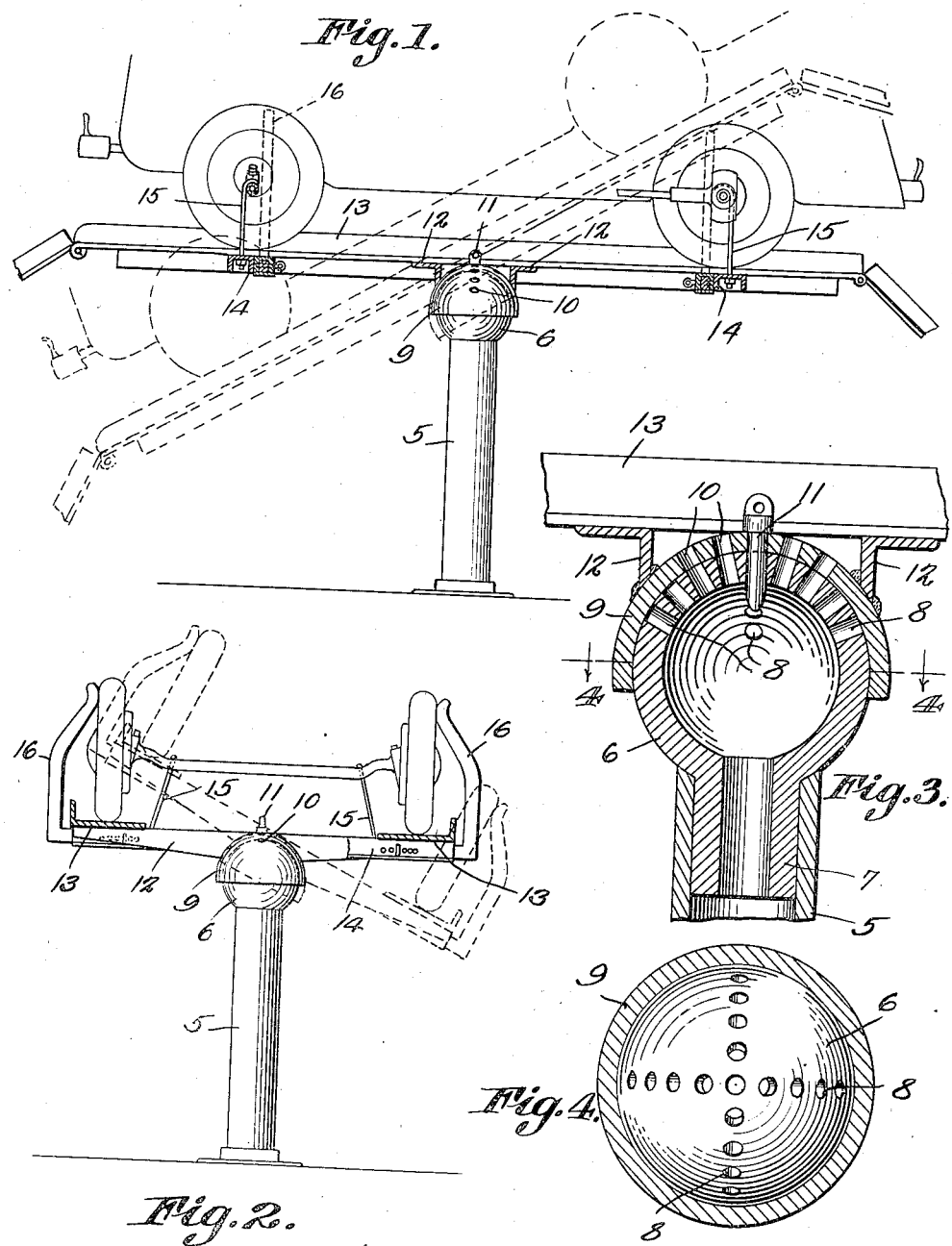

2,135,765

UNITED STATES PATENT OFFICE 2,135,765

GREASING RACK

James M. Paine, Harlingen, Tex.

Application March 3, 1937, Serial No. 128,862

3 Claims. (Cl. 214—1)

This invention relates to lifts designed for use in elevating motor vehicles to a position wherein ready access may be had to the various grease cups and lubricating unions thereof.

An important object of the invention is to provide a lift of this character which will permit of universal tilting movement of the vehicle resting on the lift, to the end that the motor vehicle may be moved to practically any required angle to facilitate the greasing operation.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view of a lift constructed in accordance with the invention, the lift being shown in dotted lines as in a tilted position.

Figure 2 is a transverse sectional view through the lift, the elevating post and lift support being shown in elevation.

Figure 3 is a vertical sectional view through the head and socket support of the lift.

Figure 4 is a sectional view taken on line 4—4 of Figure 3.

Referring to the drawing in detail, the reference character 5 designates the elevating post of the lift, which is operated in the usual and well known manner.

The reference character 6 designates the head of the lift, which is formed with an extension 7 adapted to be fitted in the upper end of the lifting post 5, as clearly shown by Figure 3 of the drawing. As shown, the upper end of the post 5 is beveled slightly to conform to the shape of the head 6, to the end that the head 6 may be rotated within the post 5, so that the frame of the lift, together with the motor vehicle supported thereon, may be rotated to adjust the lift.

The head 6 is formed with lines of spaced openings indicated by the reference character 8, the lines of openings crossing at the apex of the head. Mounted on the head 6, and conforming with the contour of the head, is a socket member indicated by the reference character 9, which socket member is also provided with openings 10 adapted to register with the openings 8 of the head 6, for the reception of the pin 11, so that the socket member may be held in various positions of adjustment with respect to the head 6, for purposes to be hereinafter more fully described.

Secured to the socket member 9, are spaced parallel angle bars 12, which angle bars provide support for the track sections 13 of the lift, the track sections 13 being secured to the angle bars 12 in any suitable and well known manner.

Transversely disposed channel bars 14 have connection with the track sections 13, at points near the outer ends of the track sections, bracing the track sections in such a way as to prevent spreading of the track sections under the weight of a motor vehicle resting thereon.

Securing rods indicated by the reference character 15 are connected with the channel bars 14 and extend upwardly where they are hooked over the axles of the motor vehicle, securing the motor vehicle against movement with respect to the track sections.

Adjustable clamping arms 16 are also supported by the channel bars 14, and are adapted to be moved to positions to clamp the wheels of the motor vehicle, as shown by Figure 2 of the drawing, to the end that when the lift is tilted laterally as shown, the arms 16 will prevent the motor vehicle from sliding from the track sections.

From the foregoing it will be seen that due to the construction shown and described, the lift may be tilted to any desired position to insure ready access to the grease cups or alemite unions of the motor vehicle structure.

Having thus described the invention what is claimed is:

1. In a motor vehicle greasing rack, a central lifting post, a hollow head rotatably mounted on the upper end of the lifting post, and having lines of openings, formed therein, a pair of track sections, mounted for pivotal movement on the head, transversely disposed bars connecting the track sections, said mounting including a socket member having lines of openings fitted over the hollow head, a pin extended into the openings for holding the socket member and track sections in their positions of adjustment, and said head adapted to rotate on the upper end of the post.

2. In a motor vehicle greasing lift, a post, a spherically-shaped head mounted on the post, a socket member fitted over the head, track sections mounted on the socket member, said head and socket member having openings adapted to register when the socket member is adjusted with respect to the head, and a pin adapted to be extended through certain of the openings, holding the socket member in various positions of adjustment on the head.

3. In a motor vehicle greasing lift, a post having an open upper end, a spherically-shaped head, an extension on the head, said head being fitted in the open end of the post for rotary movement in a horizontal plane, a socket member fitted over the head, track sections secured to the socket member, said socket member being fitted over the head for universal pivotal movement on the head, and a removable holding member adapted to secure the socket member against movement on the head under normal conditions.

JAMES M. PAINE.